US012338118B2

(12) United States Patent
Van Der Leeden et al.

(10) Patent No.: US 12,338,118 B2
(45) Date of Patent: Jun. 24, 2025

(54) KIT-OF-PARTS CONFIGURED TO ADJUST A FIT OF A SADDLE, SADDLE OF THE ENGLISH SADDLE TYPE, COMPRISING SUCH A KIT-OF-PARTS AND METHOD FOR ADJUSTING A FIT OF A SADDLE

(71) Applicant: EQUIFUNCTIONAL B.V., Kedichem (NL)

(72) Inventors: Jolanda Elisabeth Van Der Leeden, Kedichem (NL); Fieke Schulten-Branderhorst, Doorwerth (NL)

(73) Assignee: EQUIFUNCTIONAL B.V., Kedichem (NL)

( * ) Notice: Subject to any disclaimer, the term of this patent is extended or adjusted under 35 U.S.C. 154(b) by 164 days.

(21) Appl. No.: 17/911,365

(22) PCT Filed: Mar. 18, 2021

(86) PCT No.: PCT/NL2021/050186
§ 371 (c)(1),
(2) Date: Sep. 13, 2022

(87) PCT Pub. No.: WO2021/187985
PCT Pub. Date: Sep. 23, 2021

(65) Prior Publication Data

US 2023/0093396 A1 Mar. 23, 2023

(30) Foreign Application Priority Data

Mar. 18, 2020 (NL) ..................................... 2025160

(51) Int. Cl.
*B68C 1/04* (2006.01)

(52) U.S. Cl.
CPC .......... *B68C 1/04* (2013.01); *B68C 2001/044* (2013.01)

(58) Field of Classification Search
CPC ........ B68C 2001/004; B68C 1/04; B68C 1/02
See application file for complete search history.

(56) References Cited

U.S. PATENT DOCUMENTS 5,343,674 A * 9/1994 Brown ...................... B68C 1/04 54/44.1
6,588,185 B1 * 7/2003 Goblet .................... B68C 1/025 54/44.3
(Continued)

FOREIGN PATENT DOCUMENTS

| | | | |
|---|---|---|---|
| CA | 2624098 | A1 | 7/2008 |
| GB | 2282742 | A | 4/1995 |
| WO | WO-2018065929 | A1 * | 4/2018 |

OTHER PUBLICATIONS

International Search Report and Written Opinion dated Jun. 25, 2021, for Application No. PCT/NL2021/050186 (13 pages).

*Primary Examiner* — Morgan T Jordan
*Assistant Examiner* — Shada Mohamed Alghailani
(74) *Attorney, Agent, or Firm* — KDW Firm PLLC

(57) ABSTRACT

A kit-of-parts configured to adjust a fit of an English saddle includes a base and a shim having a predetermined thickness. The shim is releasably connected to the base to allow selective replacement thereof, and the base is affixable to, or integrated with, one of left and right tree points of a rigid saddle tree. The releasable connection includes a guide for providing a reproducible and predetermined locking engagement of the shim relative to the base to guarantee that the shims are arrangeable on the same position and orientation relative to the respective one of the left or right tree points. A saddle including such a kit-of-parts and corresponding method for adjusting the fit of a saddle.

16 Claims, 5 Drawing Sheets

(56) References Cited

U.S. PATENT DOCUMENTS

| | | | | |
|---|---|---|---|---|
| 2005/0066630 | A1* | 3/2005 | Fairfax | B68C 1/04 54/44.1 |
| 2005/0086914 | A1 | 4/2005 | Fennely | |
| 2007/0137148 | A1* | 6/2007 | Foster | B68C 1/12 54/66 |
| 2007/0209332 | A1* | 9/2007 | Kaden | B68C 1/12 54/44.5 |
| 2012/0137640 | A1 | 6/2012 | Diaz | |

* cited by examiner

KIT-OF-PARTS CONFIGURED TO ADJUST A FIT OF A SADDLE, SADDLE OF THE ENGLISH SADDLE TYPE, COMPRISING SUCH A KIT-OF-PARTS AND METHOD FOR ADJUSTING A FIT OF A SADDLE

This application is a national stage filing under 35 U.S.C. 371 of International Application No. PCT/NL2021/050186, filed Mar. 18, 2021, which claims priority to Netherlands Patent Application No. 2025160, filed Mar. 18, 2020, the entirety of which applications are incorporated by reference herein.

The present disclosure relates to an English saddle, such as an equestrian saddle, to support a rider. The present disclosure in particular relates to a kit-of-parts configured to adjust a fit of such a saddle, a saddle of the English type comprising at least a base of such a kit-of-parts and a method for adjusting the fit of a saddle.

Saddles of the so-called English type comprise a saddle tree, which is a rigid frame around which the rest of the saddle is built. The saddle tree is rigid to provide optimized stability and weight distribution. The saddle tree of the saddle comprises two saddle tree points, i.e. a left and a right saddle tree point, that extend therefrom and are configured to contact an animal's body.

The fit of an English saddle is greatly determined by the width of the saddle, wherein a distance between said left and right tree points defines said width of said saddle. Saddle fitting of English saddles is the art of adjusting this width to obtain an optimized fit of the saddle on the respective horse to effectively distribute the weight of a rider over an enlarged surface area in conjunction with planar members, referred to as panels, thereby protecting said animal's back from the weight of the rider and providing a stable seating for the rider.

Panels are moldable parts, and they define an offset between the horse and the rigid saddle tree. The flexibility of the moldable panels allows the muscles to function by providing a moldability that allows the muscles to deform during contraction and release during physical exercise. Ideally, the stiffness of the pads is close to the stiffness of the muscles.

For such English saddles, a proper fit with respect to the physical dimensions of the animal on which it is placed is of paramount importance. This fit is to a large extend dependent on the size of the saddle tree and in particular (the distance between) the saddle tree points relative to a transversal width of the animal, called the width of the saddle. A poorly fitting saddle may already occur if the width of the saddle deviates in the order of 5 mm from the actual width needed for the animal at that time. Such a minor deviation may already result in discomfort of the animal, blockage of certain muscles and/or nerves that may inhibit movement and the display of undesirable behaviour by the animal Physical performance may moreover decrease, which is especially a disadvantage for e.g. sport horses. Prolonged usage of a poorly fitting saddle may moreover result in injuries such as soreness, open wounds, lameness and poor overall physical future development of the animal. In addition, such predicaments may lead to dangerous situations for the animal and/or the rider.

To prevent such predicaments, a great amount of care is taken to measure the physical dimensions of an animal to which a saddle is to be fitted, so that a saddle having the correct size with respect to these physical dimensions may be selected. Alternatively, a custom made saddle may be manufactured based on these physical dimensions, which typically results in an even better fit.

Regardless of which known method is utilised to initially fit a saddle to the physical dimensions of an animal, these physical dimensions will change over time. Horses in particular are known to gain or lose muscle and/or fat tissue over the course of their life times, which results in their physical dimensions to likewise change. Such changes may occur over relatively short time spans, such as from one season to another. Over time, these changes in physical dimensions accumulate to be significant enough to compromise a proper fitting of the saddle, which as elucidated above potentially results in numerous issues.

To account for such changes, one may fit an entirely new saddle to an animal of which the physical dimensions have changed. This is, however, associated with significant costs as a saddle requires a significant financial investment. It is therefore often preferable to adjust an existing saddle so that it once more fits the physical dimensions of the animal on which it is placed. One of the conventional ways of adjusting the fit of a saddle in essence constitutes adjusting the width of its saddle tree by exerting thereon a high force to force the saddle tree in the (more) desired size of the width. While such a procedure is significantly less costly than the purchase of a new saddle, it is nevertheless associated with numerous disadvantages.

The first of these disadvantages being, that it requires specialised equipment in the form of a saddle adjusting machine operated by a certified and experienced craftsman to ensure that the procedure is performed correctly.

A second disadvantage of known saddle adjustment techniques is that they result in unwanted additional deformations of the saddle tree that may negatively affect a proper fit of the saddle with respect to the animal on which it is to be placed. For example, exerting a force in a width direction of a saddle tree to reduce its width dimension results inevitably in a corresponding change of a shape of a front arch of the saddle tree, resulting in an undesirable fit of the saddle.

A third disadvantage is that known saddle adjustment techniques compromise the physical integrity of the saddle, resulting in a saddle that is more prone to breakage. After all, deforming the saddle tree to adjust the shape introduces internal stresses in the saddle tree. Saddles comprising a wooden saddle tree interconnected with metal portions by means of rivets are particularly susceptible to this disadvantage, as many types of wood comprise a relatively low degree of flexibility and the rivet connections may moreover loosen during the deformation of the saddle. The risk of permanent damage to the saddle tree is aggravated when the saddle adjustment procedure is performed more than once to account for further changes in the physical dimensions of the animal over time.

A fourth disadvantage is that the adjusted shape of the saddle tree cannot be retained over long periods of time. In part, this results from an apparent inherent tendency of the saddle tree to assume its original shape prior to its adjustment. Moreover, forces exerted upon the saddle tree during usage thereof may likewise partially undo the previously performed adjustment of its shape. Over time, this results in a necessity to once more adjust the size and shape of the saddle tree, which in addition further aggravates the above stated disadvantages of known saddle adjustment techniques.

US 2007/209332 A1, that is considered the closest prior art, discloses a saddle of a Western type, that are rigid saddles, wherein pads (or blankets), that are separate from the saddle, are placed below the saddle to adjust the fit of the saddle on the horse. Relative to this document, at least the characterizing feature of claim 1 are novel.

Contrary to US 2007/209332 A1 being directed to Western type saddles, the invention is directed to English type saddles, which is a very different type of saddle. English saddles comprise a static part defined by a rigid saddle tree having left and right tree points that are arranged on opposite sides of said saddle tree, and a flexible part defined by a left moldable panel and a right moldable panel that are each configured to contact a horse on a left and a right side of a spine of said horse, respectively, wherein said left moldable panel and said right moldable panel are fixed to the saddle tree. The western type saddle tree comprises a cantle, bars, a fork and a horn, but doesn't have the defined tree points, supported by a relatively small area, as used on an English type saddle having a saddle tree.

US 2007/209332 A1 discloses that shims may be attached to a base structure of the Western saddle using Velcro connectors. Such Velcro connectors provide a large freedom of placement of the shims, which is perfectly fine for the type of use associated with the Western type of saddle to which this prior art document relates. After all, as mentioned above, pads (or blankets) are additionally used to adjust the form fit to the back of the horse, in conjunction with the bars that are contacted and supported by a much larger area than the tree points of an English saddle tree. However, in order to adjust a width of an English type saddle, a high level of accuracy in the order of a few millimeters is required. After all, saddle fitting of an English saddle requires the shims to be placed in high accuracy, wherein a misplacement of only a few millimeters in the already small bearing area may result in different negative side effects, such as limiting the movement of the muscles of the horse and imbalance in the saddle, with associated negative effects to both the horse and the rider.

US 2005/086914 A1 proposes to apply a separate saddle pad system to adjust the fit of a Western type of saddle to the back of a horse, similar to the pads (or blankets) discussed above. It proposes to apply removable inserts that may help to distribute the weight of the saddle and rider over a plurality of locations, and mitigate chafing and rubbing of the saddle and pad against the animal, especially in the area of the spinal column.

GB 2 282 742 A is also directed to English saddles. It proposes the use of a plurality of deformable panels which in user are positioned between the saddle tree and the back of a horse on which the saddle tree is mounted. Each panel is filled with a material, such as a gas, a liquid, a granular material or a foam, so that its contour adapts automatically to complement the surface of the back of the horse on which the saddle tree is mounted. The adjustments comprises the moldable part of an English saddle, not the rigid part. Again, Velcro is proposed as a releasable connector.

US 2012/137640 A1 and CA 2 624 098 A1 are acknowledged as further prior art.

The objective of the present disclosure is to provide a means for adjusting the fit of a saddle with which at least some of the above stated, or further, disadvantages of known saddle adjustment means are abated.

The above stated objective is achieved with a kit-of-parts configured to adjust a fit of a saddle according to claim 1, said kit-of-parts comprising at least one base configured to be affixed to, or integrated with, an underside of the saddle; at least one shim having a predetermined thickness; and a releasable connection between the at least one base and the at least one shim for replacement of said shim for another shim having an other predetermined thickness, wherein:

- the kit-of-parts is configured to adjust a width of an English type saddle, wherein said width is defined by a distance between left and right tree points that are arranged on opposite sides of a rigid saddle tree and that are configured to abut against ribs of a horse during use;
- the at least one base is configured to be affixed to, or integrated with, one of the left and right tree points of the saddle tree; and
- the releasable connection comprises a guide configured to provide a reproducible and predetermined locking engagement of the shim relative to the base to thereby guarantee that said shim and said other shim having another predetermined thickness are arrangeable on the same position and orientation relative to the respective one of the left or right tree points of the saddle tree.

The guide of the releasable connection enables a saddle fitter or user to easily remove a shim from the base and replace it for another shim having another thickness, while said guide also guarantees that the other shim having another thickness will be automatically arranged on the exact same position and orientation as the shim that was removed in order to be replaced. Thus, once a base has been accurately positioned on the saddle tree points, either during manufacture of the saddle tree or in retrofit, successive exchange of shims is very easy, fast and reliable. In this way, the present invention offers a solution that allows user to regularly adjust the saddle width, thereby improving comfort and performance of the horse.

Moreover, the need to apply conventional saddle adjustment techniques compromising the physical integrity of the saddle and resulting in a saddle that is more prone to breakage due to internal stresses being introduced into the saddle tree, may be significantly reduced or may even become completely redundant.

According to a preferred embodiment, the base and the at least one shim comprise interlocking shapes to establish the releasable connection there between. Using interlocking shapes a reproducible fit of the shim on the base may be guaranteed.

According to a further preferred embodiment, the guide is defined by a tab and a associated recess that is configured to receive said tab therein, and at least one of the at least one base and the at least one shim comprises the tab, and at least one other of the at least one base and the at least one shim comprises the associated recess. A tab and recess is an easy to produce and arrange type of interlocking shape, wherein the skilled person will acknowledge that it does not matter whether the tab is arranged on the shim and the recess on the base, or vice versa.

According to an even further preferred embodiment, the at least one shim comprises the tab and the base comprises the associated recess that is configured to receive said tab therein. Any protruding parts may be absent on the base if the tab is arranged on the shim, which has the advantage that the base may also be used without a shim if the base alone would happen to already result in the desired width of the English saddle in a specific situation.

The above stated objective is moreover achieved with a saddle of the "English" saddle type, comprising:

- a static part defined by a rigid saddle tree having left and right tree points that are arranged on opposite sides of said saddle tree, wherein a distance between said left and right tree points define a width of said saddle;

a flexible part defined by a left moldable panel and a right moldable panel, each configured to contact a horse on a left and a right side of a spine of said horse, respectively, wherein said left moldable panel and said right moldable panel are fixed to the saddle tree;

said saddle having affixed thereto, or integrated therewith, at at least one of the left and right tree points of the saddle tree thereof, a base of a kit-of-parts according to the invention.

Although it is conceivable that the base or bases are arranged, during manufacture of the saddle, wherein they are preferably integrated in the saddle tree points of the saddle tree, a kit-of-parts according to the invention may also be arranged in retrofit.

According to a preferred embodiment of the saddle, said saddle has affixed thereto, or integrated therewith, two bases according to the kit-of-parts according to the invention, wherein a first base of the two bases is arranged on the left tree point and a second base of the two bases is arranged on the right tree point of the saddle tree. This allows the width of the saddle to be adjusted on both sides of the saddle tree. In this way it is possible to either maintain a balanced weight distribution and width adjustment on the left and right sides of the horse. On the other hand, in rare situations wherein the horse may have an imbalance in body size, a deliberate difference in thickness of the shims arranged on the left and the right tree point may compensate for this imbalance, thereby providing an optimal balanced fit of the saddle. Such an imbalance in body size of the horse may occur when the horse has stronger and more developed muscle tissue behind the scapula, where the tree points of the saddle tree are supported, on one of the sides relative to the spine.

According to a further preferred embodiment of the saddle, the first base that is arranged on the left tree point and the second base that is arranged on the right tree point are arranged exactly opposite each other relative to a central longitudinal plane of the saddle. Opposite arrangement of the bases provides symmetry and thereby contributes to an even weight distribution.

In addition, the above stated objective is achieved with a method for adjusting a fit of an English saddle, the method comprising:

determining a size difference between a transversal width of an animal and a width of the saddle;

removing a shim that is releasably connected to a base that is affixed to, or integrated with, a left or a right saddle tree point of a saddle tree of the saddle;

based on the determined size difference, selecting at least one other shim having another predetermined thickness than the shim that has been removed from the base, wherein the one or more than one other shim at least substantially compensates for the size difference between the transversal width of the animal and the width of the saddle; and releasably connecting the selected other shim to the base by a guide that is configured to provide a reproducible and predetermined locking engagement of the other shim relative to the base to thereby guarantee that said shim and said other shim having another predetermined thickness are arrangeable on the same position and orientation relative to the respective one of the left or right tree points of the saddle tree.

According to a preferred embodiment of the method, the width of the English saddle is defined by a distance between left and right tree points that are arranged on opposite sides of a rigid saddle tree and that are configured to abut against ribs of a horse during use.

According to a further preferred embodiment of the method, the step of selecting the at least one shim comprises selecting said shim out of a group of shims, each of which comprising varying predetermined thicknesses.

According to an even further preferred embodiment of the method, the step of releasably connecting the at least one selected shim to the base comprises connecting the base and the at least one shim by interlocking their interlocking shapes.

According to an even further preferred embodiment of the method:

the guide is defined by a tab and a associated recess that is configured to receive said tab therein; and at least one of the at least one base and the at least one shim comprises the tab, and at least one other of the at least one base and the at least one shim comprises the associated recess; and the step of releasably connecting the at least one selected shim to the base comprises arranging the tab into the associated recess.

The aforementioned kit-of-parts, saddle and method allow for size adjustment of a saddle without altering the shape of a saddle tree of said saddle, which results in a saddle having an adjusted size without the numerous above elucidated disadvantages.

Preferred embodiments of the kit-of-parts, the saddle and the method in accordance with the present disclosure are subject of the appended dependent claims.

In the following description preferred embodiments of the present invention are further elucidated with reference to the drawing, in which.

Figure 4:
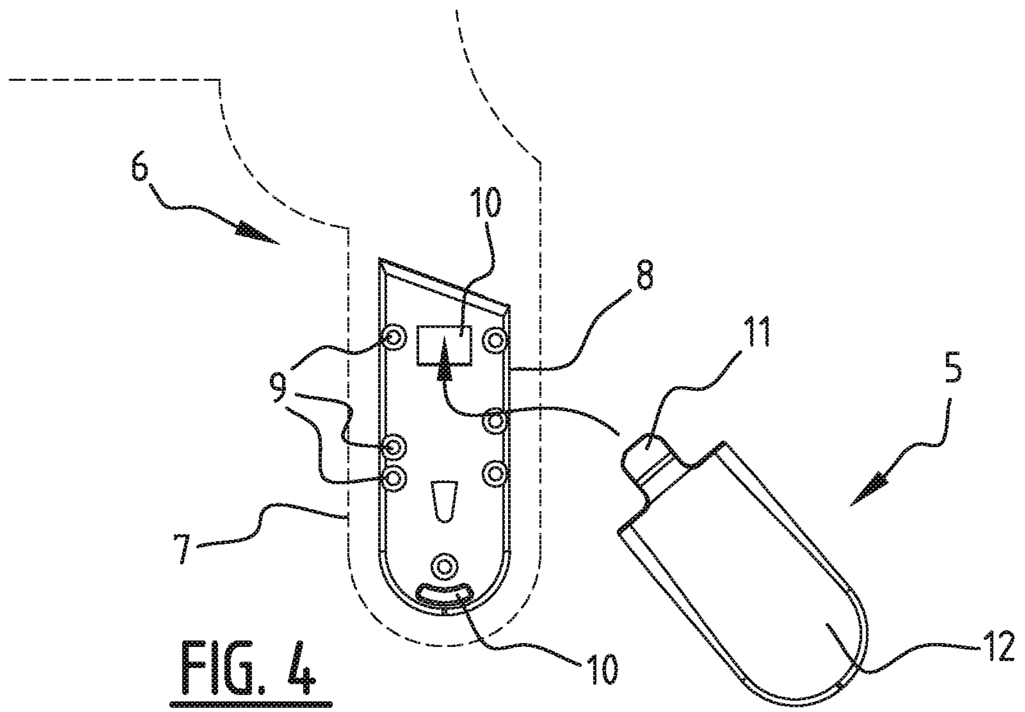
FIG. 4 illustrates a base and a shim comprised by the kit-of-parts of the first preferred embodiment depicted in FIG. 3.
Figure 5A:
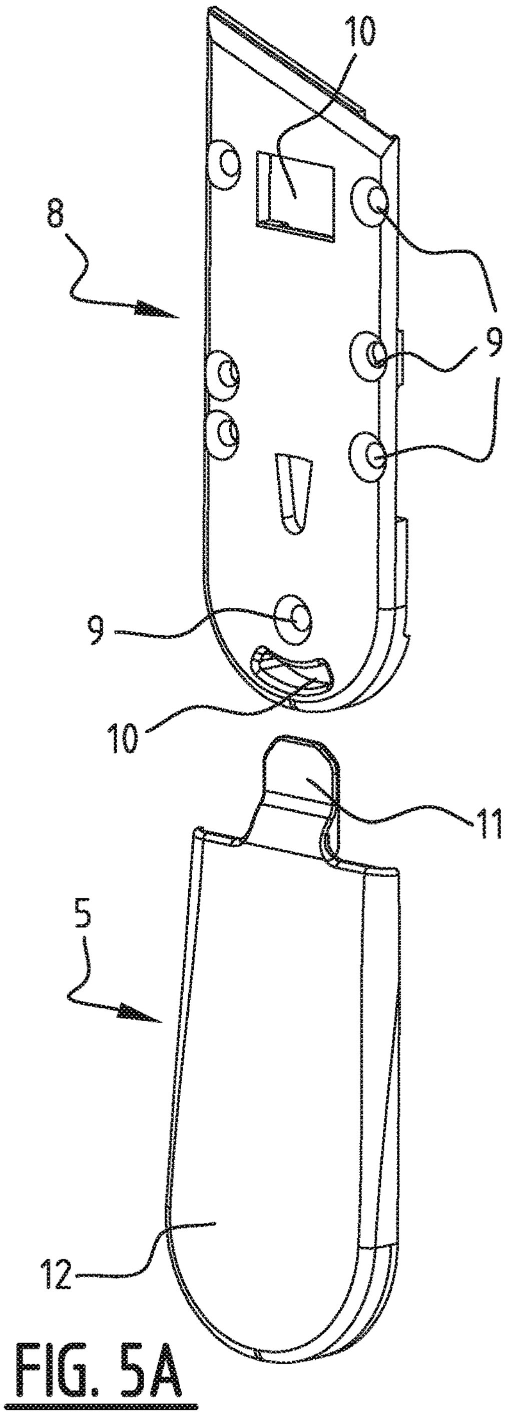
Figure 5B:
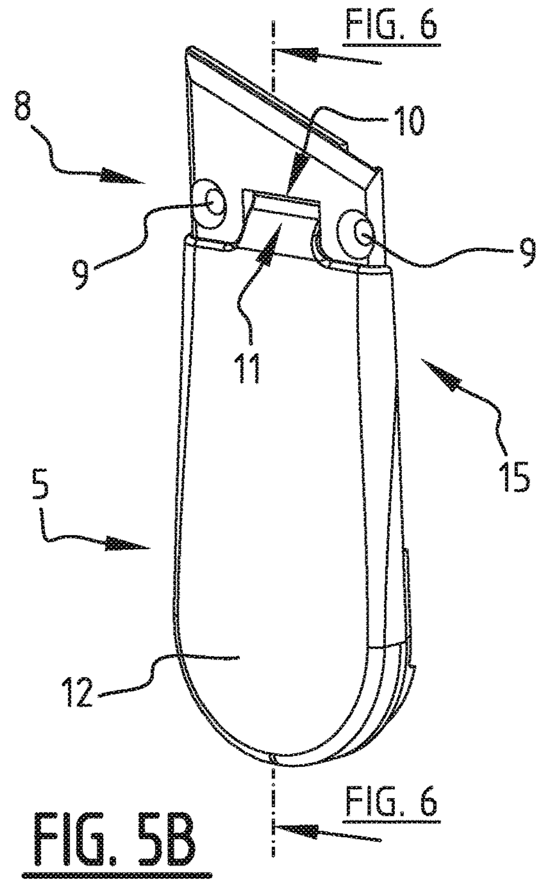
Figure 6:
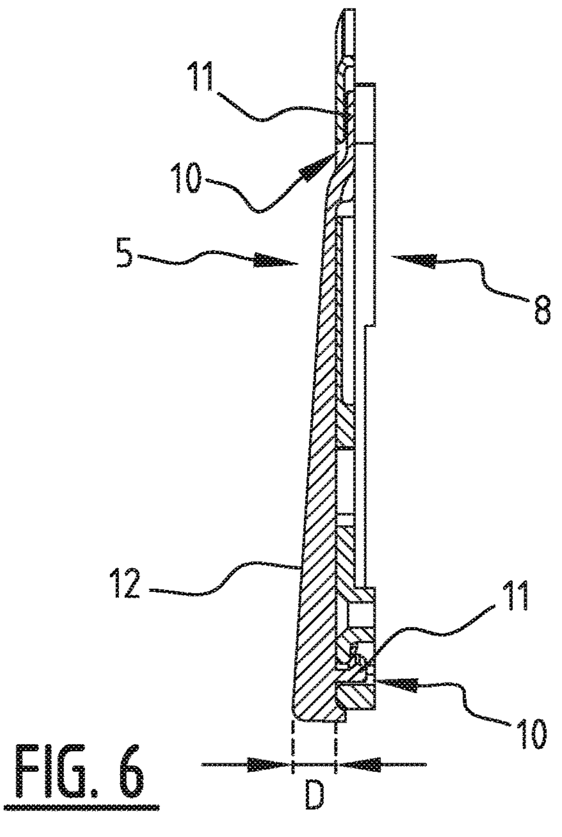
Figure 7:
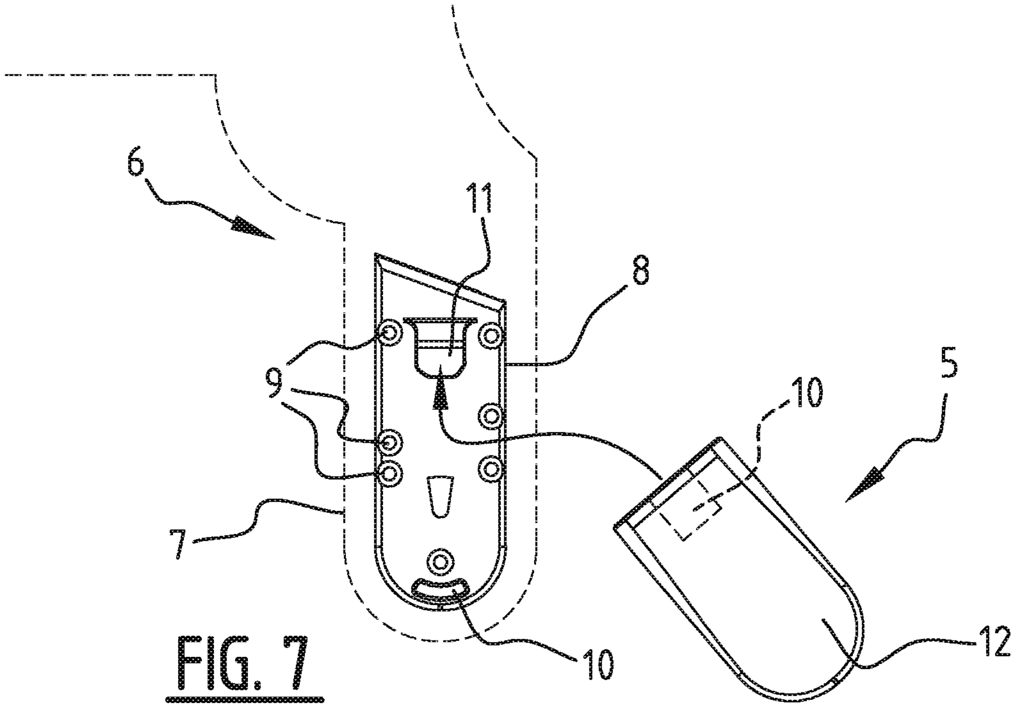
Figure 8:
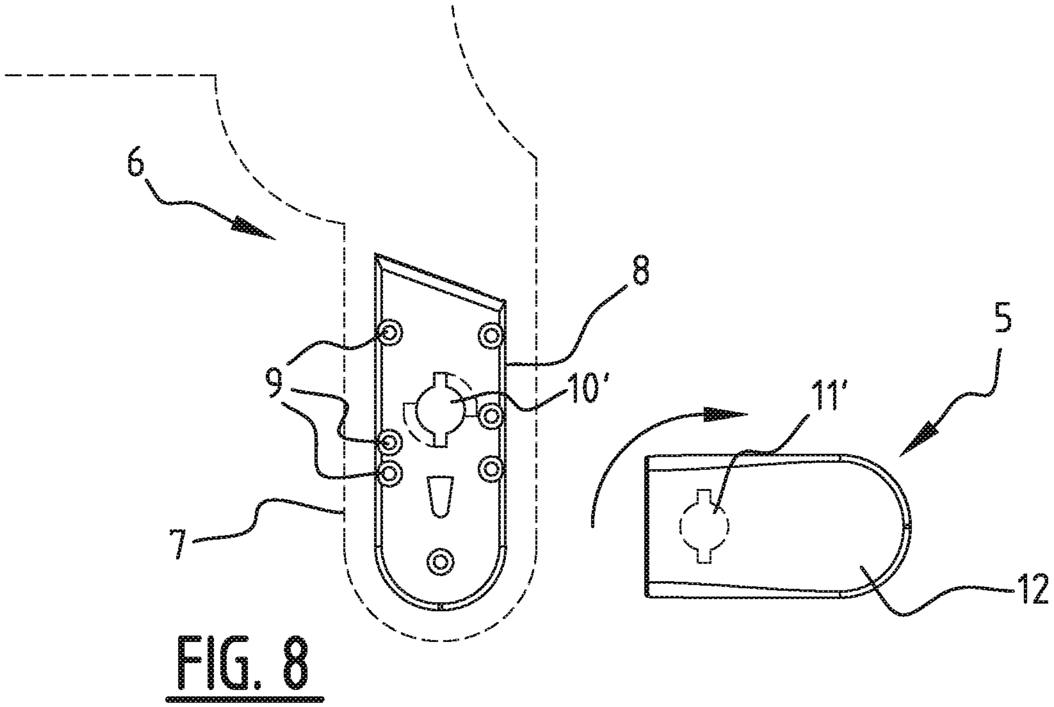
Figure 9:
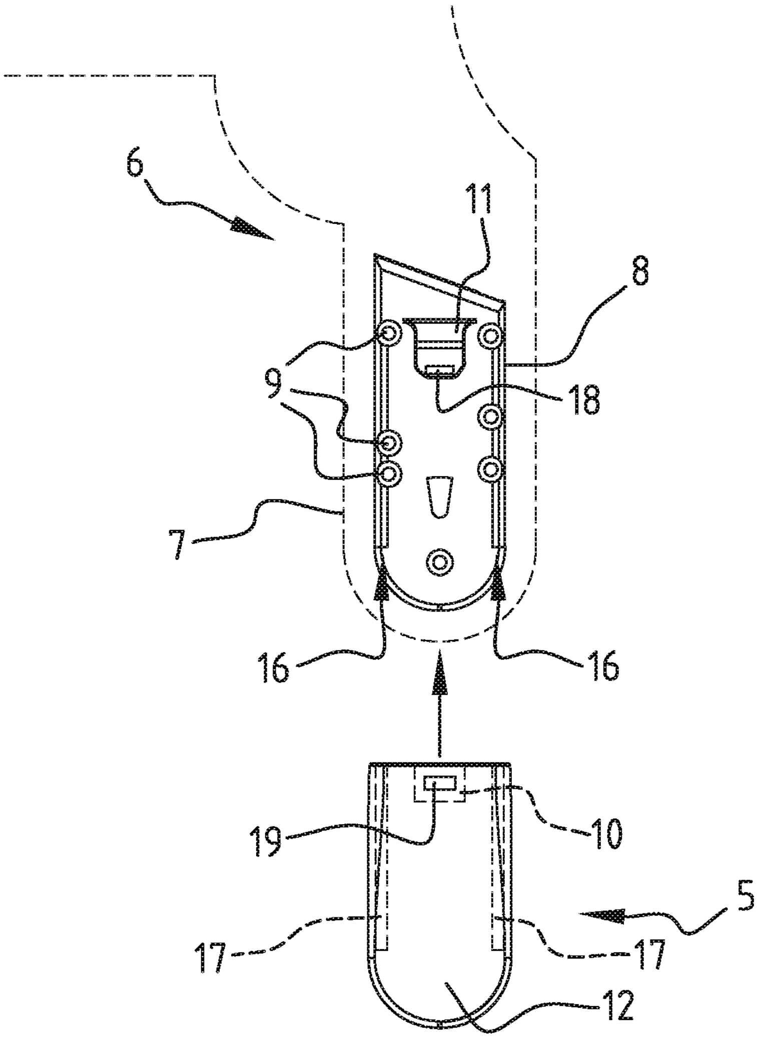

FIGS. 5A and 5B respectively depict the base and the shim of FIG. 4 in connected and disconnected states;

FIG. 6 shows a cross-section of the base and the shim in the connected state depicted in FIG. 5B; and FIGS. 7-9 show kit-of-parts according to a second, a third, and a fourth preferred embodiment, respectively, showing alternatives for a guide of the releasable connection between the at least one base and the at least one shim.

Figure 1:
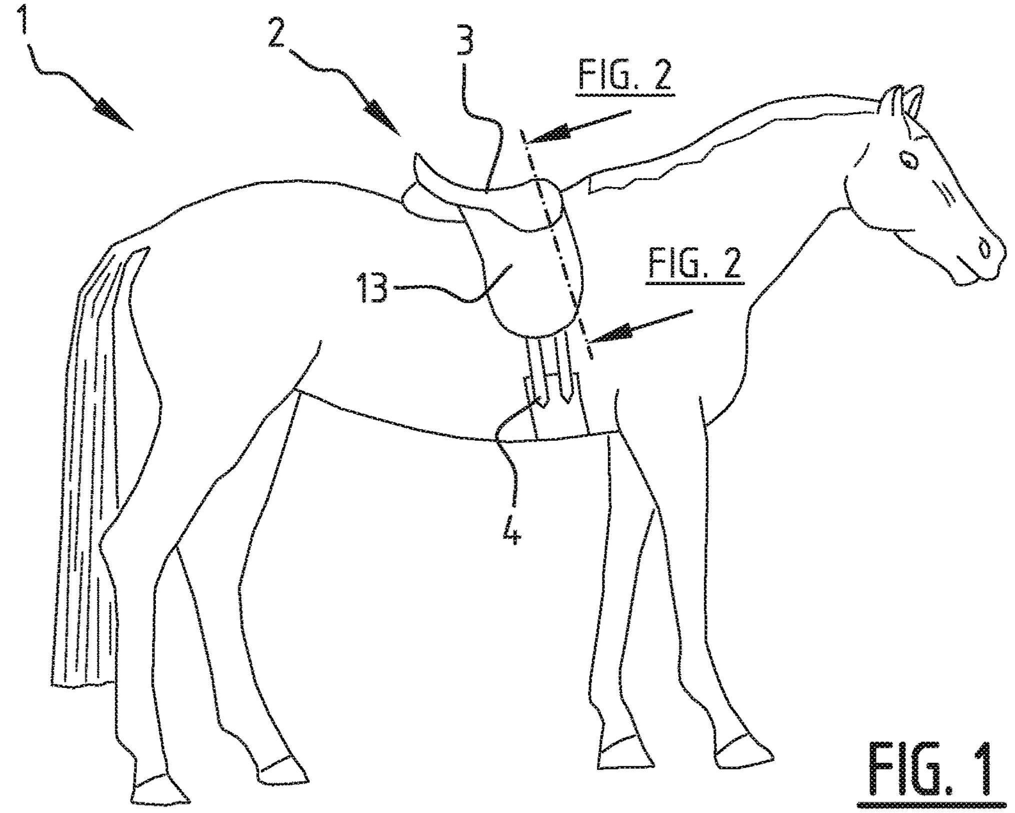
FIG. 1 depicts an animal having placed thereon a saddle in accordance with the present disclosure.

FIG. 1 illustrates an animal 1, having placed thereon a saddle 2 in accordance with the present disclosure. Saddle 2 is placed in accordance with the general requirements to ensure, on the one hand, a stable sitting for a (not shown) rider and, on the other hand, an adequate distribution of pressure over a backside surface of the animal 1 to allow an unhindered contraction and release of muscles while simultaneously preventing any one of the aforementioned predicaments regarding the health of the animal 1. The saddle 2 may moreover comprise any one of the conventional parts typically found on saddles known in the art. A sitting surface 3 and billet straps 4 are mentioned here merely as examples.

Figure 2:
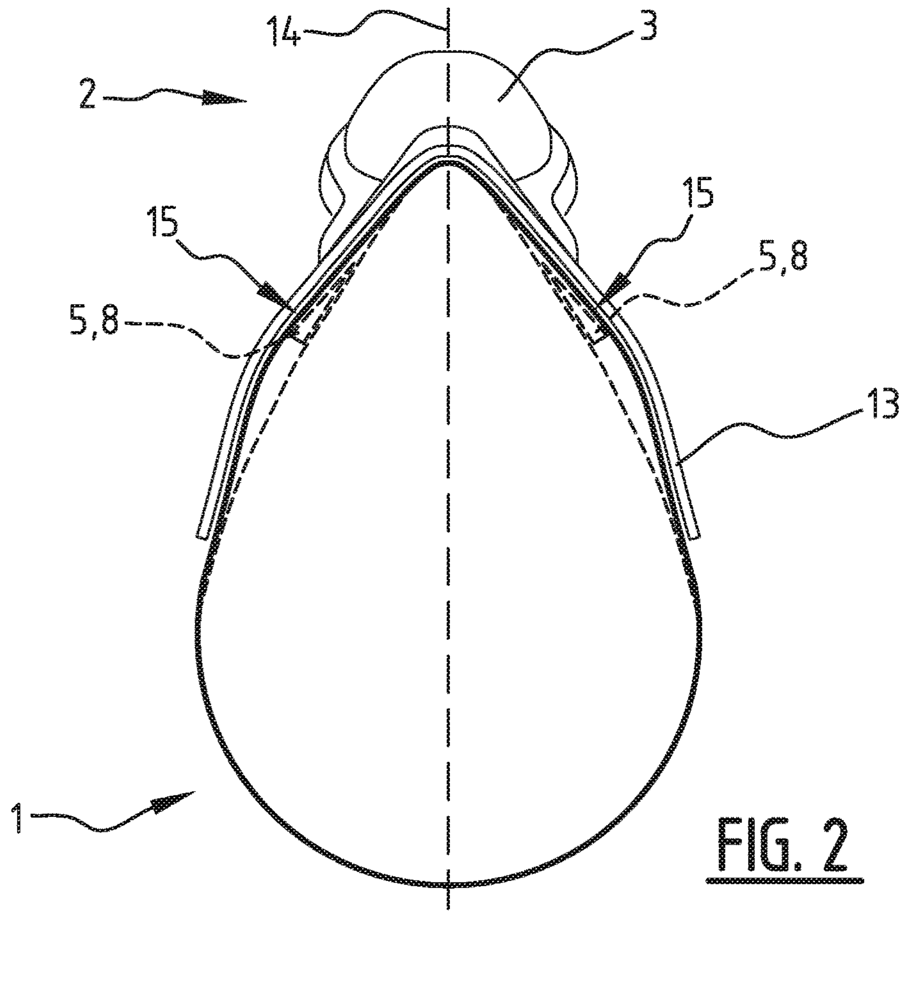
FIG. 2 depicts a cross section of the saddle depicted in FIG. 1.

FIG. 2 shows a cross section of the animal 1 having placed thereon the saddle 2 as seen through the line indicated by the two arrows in FIG. 1 to illustrate a general concept of the present disclosure. In FIG. 2, the saddle 2 as such is oversized relative to the physical dimensions of the animal 1, which would normally result in a poor fit of the saddle 2 and, as a consequence thereof, the numerous above described health predicaments. However, in FIG. 2 an adequate fit of the saddle 2 on the back of the animal 1 is nevertheless achieved by two assemblies 15 arranged at an underside of the saddle 2 that contacts the back surface of the animal 1. Each one of the assemblies 15 respectively comprises a base 8 and a shim 5 that will be elucidated further below.

Figure 3:
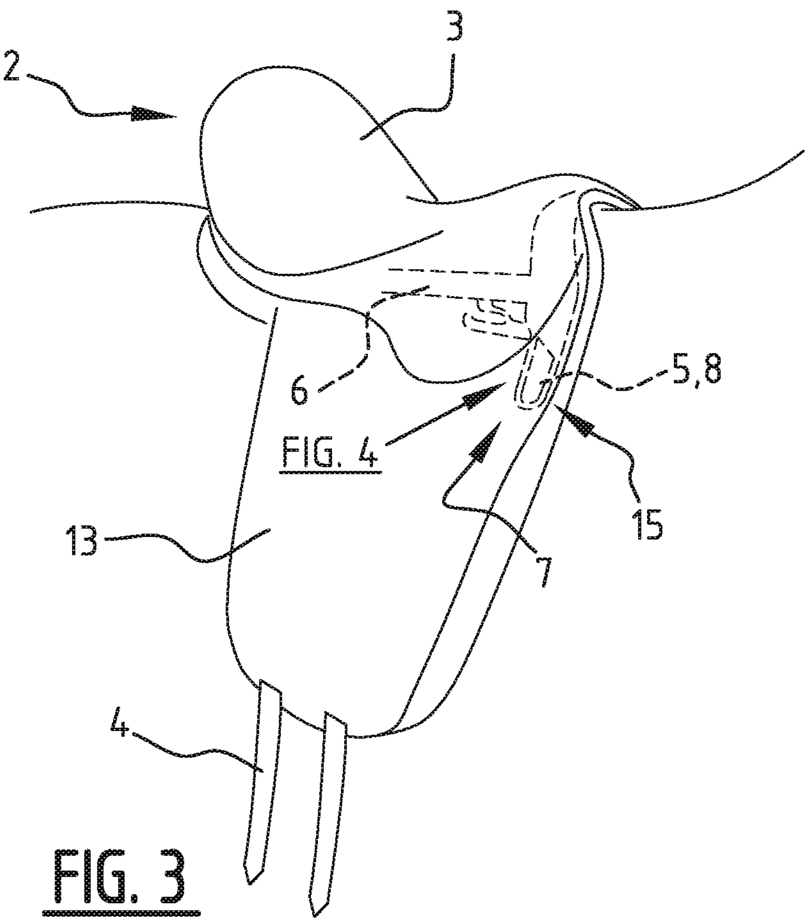
FIG. 3 shows a perspective view of the saddle of FIG. 2 comprising a kit-of-parts in accordance with a first preferred embodiment of the present disclosure.

FIG. 3 depicts a close-up view of the saddle 2 as depicted in FIG. 1 and FIG. 2. As may be discerned from FIG. 3, the saddle 2 moreover comprises a saddle tree 6 in addition to a sitting surface 3, billet straps 4 and a flap 13. The saddle tree 6 serves as a frame upon which further parts constituting the saddle 2 are built and thus to a large extend dictates the overall size and shape of the saddle 2 and by extension its fitting on the animal 1. The saddle tree 6 preferably comprises a rigid structure and may moreover comprise a wood material, a metal material or a synthetic material, or any combination of the aforementioned materials; and in certain embodiments of the present inventive concept may be a saddle tree of the type that is known in the art.

The saddle tree 6 of the English saddle 2 comprises a saddle tree point 7 constituted by a protrusion extending from the saddle tree 6. While only one saddle tree point 7 is depicted in FIG. 3, two corresponding saddle tree points 7 may be provided at opposite sides of the saddle 2 relative to a central plane 14 of the saddle 2, said two saddle tree points 7 thereby partly enclosing an outer perimeter of the animal 1 in a manner that is similar to that of saddles known in the art. A length of the saddle tree point 7 may vary depending on requirements with respect to a fitting of the saddle 2 on the animal 1 or a riding position of a rider.

In accordance with the present disclosure, the saddle tree point 7 may comprise the assembly 15 that is likewise depicted in FIG. 2. In certain embodiments in accordance with the present disclosure, at least part of the assembly 15 may be affixed to an underside of the saddle 2 that contacts the back of the animal 1 when placed on the animal 1. In these embodiments, the assembly 15 is preferably affixed to a portion of the underside of the saddle 2 situated at or near a location of the saddle tree point 7.

Exemplary means by which at least part of the assembly 15 may be affixed in the aforementioned manner will be elucidated below with reference to FIGS. 4 to 6.

FIG. 4 depicts a close-up of a base 8 arranged at, or integrated with, the saddle tree point 7 of the saddle tree 6. In the depicted embodiment the base 8 comprises an approximately planar, flattened body.

The shim 5 is substantially wedge shaped and comprises an abutment surface 12 which, in a state in which the shim 5 is releasably connected to the base 8, abuts a side of the animal 1. Both the shim 5 and the base 8 may comprises a plastic material or any alternative material that is suitable in terms of durability and rigidity.

Particularly in embodiments wherein the base 8 is affixed to the saddle 2, the base 8 may comprise one or more through holes 9 for affixing the base 8. Each one of the through holes 9 may be dimensioned accordingly to receive there through a connector, such as a staple connection, for affixing the base 8. The plurality of the through holes 9 may be dispersed over the approximately planar, flattened body of the base 8 to ensure an adequate affixation. Moreover, each one of the through holes 9 may be dimensioned and configured to receive there through alternative connections means, with screws, bolt-and-nut assemblies, staple connections and stitching being provided here merely as examples.

Embodiments of the base 8 that are not integrated with any section of the saddle tree 6, but are instead affixed thereto, comprise the advantage that the may be applied to existent saddles.

FIG. 5A and FIG. 5B respectively depict the shim 5 and the base 8 in a disconnected and a connected state, respectively. In the depicted embodiment, the base 8 and the shim 5 respectively comprise interlocking shapes to establish the releasable connection there between. To this end, the shim 5 comprises at least one protrusion in the form of the tab 11 extending therefrom to be placed in and received by an upper associated recess 10 comprised by the base 8. More than one tab 11 and corresponding recess 10 may be provided on respectively the base 8 and the shim 5. Moreover, an outer perimeter of either one of the shim 5 and the base 8 may be configured to engage and lock around the other respective one of the shim 5 and the base 8.

The skilled person will appreciate that the releasable mutual connection of the shim 5 and the base 8 may likewise be achieved through alternative means, such through a screw action based or magnetic connector (not shown), wherein second, third and fourth preferred embodiments are shown in FIGS. 7-9, respectively. The interlocking shape-based connections of the embodiments depicted in the first preferred embodiment (FIGS. 4-6) and in a second preferred embodiment (FIG. 7), which is very closely related to the first preferred embodiment, are nevertheless preferred due to these providing a sufficiently strong connection during usage that is simultaneously easily released without requiring any specialised tools. The first preferred embodiment and the second preferred embodiment only differ in the arrangement of the tab 11 and the recess 10. In the first preferred embodiment, the tab 11 is arranged on the shim 5 and the corresponding recess 10 is arranged on the base 8. For the second preferred embodiment this is exactly opposite: the tab 11 is arranged on the base 8 and the recess 10 is arranged on the shim 5. The third and fourth preferred embodiments are discussed further below in relation to FIGS. 8 and 9.

FIG. 6 depicts a cross-sectional view of the shim 5 and the base 8 in a connected state, when viewed along the dashed lined indicated by the arrows in FIG. 5B. From said figure, it can be discerned that the shim 5 comprises two protrusions or tabs 11, arranged near opposite ends of the shim 5. The tabs 11 moreover extend into and are received by corresponding recesses 11 of the base 8.

The shim 5 moreover comprises a predetermined thickness D that is dimensioned to substantially compensate for a difference between a transversal width of the animal 1 and a size of the saddle 2 that is oversized relative to the animal 1. As such, a gap space existent at one or either side of the animal 1, defined by said lateral side of the animal 1 and the saddle tree point 7 of the saddle 2, may be substantially filled by the predetermined thickness D of the shim 5. Consequently, the saddle 2—which is over-dimensioned relative to the animal 1—nevertheless fits the animal 1 in a way that meets the aforementioned prerequisites with respect to saddle fitting, thereby preventing any one or more of the aforementioned health predicaments associated with a poor fitting of the saddle 2 and simultaneously providing maximum riding comfort to a rider of the animal 1.

In FIG. 6, predetermined thickness D of the shim 5 decreases in an upward direction thereof, resulting in the abutment surface 12 to be angled when in a connected state with the base 8. The resulted angled orientation of the abutment surface 12 ensures that the shim 5 closely follows a contour of the animal 1 in the manner best illustrated in FIG. 1, thereby ensuring an optimal transfer pressure to the back of the animal 1 by approximately the entirety of the abutment surface 12.

There may be provided a plurality of shims 5 of varying predetermined thicknesses D. In preferred embodiments, these shims 5 may be provided as part of a set comprised by a kit-of-parts in accordance with the present disclosure, with the respective predetermined thicknesses D ranging from approximately 5 mm to approximately 35 mm. In such a set of shims 5, the predetermined thickness D may increase with incremental steps of approximately 5 mm, starting from predetermined thickness of approximately 5 mm and ending with a predetermined thickness of approximately 35 mm. These respective lower and upper boundaries of the range of predetermined shim thicknesses D have been found to be sufficient to enable adjustment of the size of the saddle 2 to a wide range of animals 1.

The above described set of shims 5, each of which respectively comprising a varying predetermined thicknesses D, may be comprised by a kit-of-parts in the sense of the appended claims.

FIGS. 8 and 9 show kit-of-parts according to a third and a fourth preferred embodiment, respectively, showing further alternatives for a guide of the releasable connection between the at least one base and the at least one shim.

In FIG. 8, the guide is defined by a quarter turn/twistlock, wherein the recess 10' is arranged on the base 8, and reference number 11 refers to a mating protrusions 11' of the shim 5 that is a technical equivalent for the tab 11 of the first and second preferred embodiments. The skilled person will acknowledge that the recess 10' may also be arranged in the shim 5, in which case a mating protrusion 11' will be arranged on the base 8.

The fourth embodiment of FIG. 9 proposes that the releasable connection may comprise a combination of a rim 16 and corresponding guide slot 17 arranged on the sides of the base 8 and the shim 5. This fourth embodiment also shows that a tab 11 according to the second preferred embodiment may be further optimized by providing a locking protrusion 18 at said tab 11, that is configured to interlock with a locking recess 19 on the shim 5. By pushing the locking protrusion 18 inward, the shim 5 may be released and slid of the base 8.

According to a method for adjusting a fit of saddle 2 in accordance with the present disclosure, one may determine a size difference between a transversal width of the animal 1 and a size of the saddle 2, and subsequently select, from among the plurality of the shims 5, a shim 5 having a predetermined thickness D based on the determined size difference. The selected shim 5 may then be subsequently releasably connected to the base 8 as described above, thereby at least substantially compensating for the size difference between the transversal width of the animal 1 and the size of the saddle 2.

Selection of the shim 5 made be based solely on the size difference between the transversal with of the animal 1 and the saddle 2. However, selection of the shim 5 may moreover be based on an anticipated future weight gain or loss of the animal 1, which respectively translate in a corresponding increase or decrease of its transversal width. As such, a shim 5 may be selected that substantially, but not necessarily entirely, compensates for the aforementioned size difference between the size of the saddle 2 and the transversal width of the animal 1.

The aforementioned method may further comprise affixing, or integrating therewith, the base 8 to an underside of the saddle 2, preferably at or near a saddle tree point 7 of the saddle tree 6 of the saddle 2, and more preferably by arranging a connector, such as a staple connection, through a through hole 9 comprised by the base 8.

The present disclosure provides a kit-of-parts configured to adjust a fit of a saddle, a saddle comprising such a kit-of-parts and a method for utilising such a kit-of-parts. The invention presently disclosed is intended as an improved substitute for known saddle adjustment techniques that is cost efficient and/or does not comprise the physical integrity of the saddle.

It is noted here that the scope of protection for the developments described in the present disclosure are by no means limited to any particular feature of the embodiments described above and illustrated in the appended drawing. The scope of protection is exclusively determined based on the limitations of the appended independent claims, but may, in some jurisdictions, even encompass obvious alternatives for features in the independent claims. Other variations for specifically described elements, components and functionalities, that may also be embodied within the scope of the appended claims of the present disclosure, have been at least hinted at in the above embodiment description or the skilled person may be considered to be able to contemplate these variations within the range of this skilled person's general knowledge. This exemplary reference to alternative embodiments substantiates that any limitation to any specific feature, that is not defined as a limitation in the independent claims, is unwarranted.

The invention claimed is:

1. A kit-of-parts configured to adjust a fit of a saddle, comprising:
- at least one base configured to be affixed to, or integrated with, an underside of the saddle, the base comprising a planar, flattened body;
- at least one shim having a predetermined thickness; and
- a releasable connection between the at least one base and the at least one shim for replacement of said shim for another shim having another predetermined thickness,
- wherein:
  - the kit-of-parts is configured to adjust a width of an English type saddle, wherein said width is defined by a distance between left and right tree points that are arranged on opposite sides of a rigid saddle tree and that are configured to abut against ribs of a horse during use;
  - the at least one base is configured to be affixed to, or integrated with, one of the left and right tree points of the rigid saddle tree; and
  - the releasable connection comprises a guide configured to provide a reproducible and predetermined locking engagement of the shim relative to the base to thereby guarantee that said shim and said other shim having another predetermined thickness are arrangeable on the same position and orientation relative to the respective one of the left or right tree points of the rigid saddle tree, the guide including a tab and an associated recess configured to receive the tab therein, at least one of the at least one base and the at least one shim comprises the tab, and at least one other of the at least one base and the at least one shim comprises the associated recess.

2. The kit-of-parts according to claim 1, wherein the at least one shim comprises the tab and the base comprises the associated recess that is configured to receive said tab therein.

3. The kit-of-parts according to claim 1, further comprising a plurality of shims, each of the plurality of shims including a predetermined thickness different from the predetermined thickness of another shim of the plurality of shims.

4. The kit-of-parts according to claim 3, wherein the respective varying predetermined thicknesses of each one of the plurality of shims range from approximately 5 mm to approximately 35 mm.

5. The kit-of-parts according to claim 3, wherein the respective varying predetermined thicknesses of each one of the plurality of shims increase with intermediate steps of 5 mm.

6. The kit-of-parts according to claim 1, wherein the at least one shim is wedge shaped.

7. The kit-of-parts according to claim 6, wherein the predetermined thickness of the at least one shim decreases towards one end thereof, which is located closest to a spine of an animal when said animal is wearing the saddle of which the size is adjusted.

8. The kit-of-parts according to claim 1, wherein the base comprises at least one through hole for affixing the base to the left or right saddle tree point.

9. A saddle of the "English" saddle type, comprising:

a static part defined by a rigid saddle tree having left and right tree points that are arranged on opposite sides of said saddle tree, wherein a distance between said left and right tree points define a width of said saddle; and a flexible part defined by a left moldable panel and a right moldable panel, each configured to contact a horse on a left and a right side of a spine of said horse, respectively, wherein said left moldable panel and said right moldable panel are fixed to the saddle tree;

wherein said saddle has affixed thereto, or integrated therewith, at least one of the left and right tree points of the saddle tree thereof, the base of the kit-of-parts of claim 1.

10. The saddle according to claim 9, wherein said saddle has affixed thereto, or integrated therewith, two of said bases, wherein a first base of the two bases is arranged on the left tree point and a second base of the two bases is arranged on the right tree point of the saddle tree.

11. The saddle according to claim 10, wherein the first base that is arranged on the left tree point and the second base that is arranged on the right tree point are arranged exactly opposite each other relative to a central longitudinal plane of the saddle.

12. A method for adjusting a fit of an English saddle, the method comprising:

determining a size difference between a transversal width of an animal and a width of the saddle;

removing a shim that is releasably connected to a base that is affixed to, or integrated with, a left or a right saddle tree point of a saddle tree of the saddle;

based on the determined size difference, selecting at least one other shim from the kit-of-parts of claim 1, the at least one other shim having another predetermined thickness than the shim that has been removed from the base, wherein the one or more than one other shim at least substantially compensates for the size difference between the transversal width of the animal and the width of the saddle; and releasably connecting the selected other shim to the base by a guide that is configured to provide a reproducible and predetermined locking engagement of the other shim relative to the base to thereby guarantee that said shim and said other shim having another predetermined thickness are arrangeable on the same position and orientation relative to the respective one of the left or right tree points of the saddle tree.

13. The method according to claim 12, wherein the width of the English saddle is defined by a distance between left and right tree points that are arranged on opposite sides of a rigid saddle tree and that are configured to abut against ribs of a horse during use.

14. The method according to claim 12, wherein the step of selecting the at least one shim comprises selecting said shim out of a group of shims, each of which comprises varying predetermined thicknesses.

15. The method according to claim 12, wherein the step of releasably connecting the at least one selected shim to the base comprises connecting the base and the at least one shim by interlocking their interlocking shapes.

16. The method according to claim 12, wherein the step of releasably connecting the at least one selected shim to the base comprises arranging the tab into the associated recess.

* * * * *